United States Patent
Tigerfeldt

(12) 
(10) Patent No.: US 6,629,706 B2
(45) Date of Patent: Oct. 7, 2003

(54) VENTILATION DUCT CONSTRUCTION AND METHOD

(75) Inventor: Staffan Tigerfeldt, Helsingborg (SE)

(73) Assignee: Saint-Gobain Isover AB, Billesholm (SE)

(*) Notice: Subject to any disclaimer, the term of this patent is extended or adjusted under 35 U.S.C. 154(b) by 17 days.

(21) Appl. No.: 09/795,196

(22) Filed: Mar. 1, 2001

(65) Prior Publication Data

US 2002/0121778 A1 Sep. 5, 2002

(51) Int. Cl.⁷ ................................................. F16L 11/12
(52) U.S. Cl. ........................... 285/47; 285/192; 285/49; 52/220.8; 52/232; 52/219
(58) Field of Search .......................... 285/47, 49, 192; 52/219, 232, 220.8; 126/314–317, 307 R

(56) References Cited

U.S. PATENT DOCUMENTS

| | | | |
|---|---|---|---|
| 766,137 A | * | 7/1904 | Bropson |
| 1,210,217 A | * | 12/1916 | Schoode |
| 1,750,019 A | * | 3/1930 | Moore |
| 4,221,092 A | * | 9/1980 | Johnson .......................... 52/232 |
| 4,463,748 A | * | 8/1984 | Sinkes ........................... 126/314 |
| 4,741,276 A | | 5/1988 | Pollock |
| 4,894,966 A | | 1/1990 | Bailey et al. |
| 4,936,064 A | * | 6/1990 | Gibb ............................. 52/232 |
| 5,129,201 A | * | 7/1992 | Robertson et al. ............. 52/232 |
| 5,155,957 A | | 10/1992 | Robertson et al. |
| 5,237,789 A | * | 8/1993 | Thaler ............................ 52/219 |
| 5,452,551 A | * | 9/1995 | Charland et al. .............. 52/232 |
| 6,053,162 A | * | 4/2000 | Godfree et al. ............ 126/307 R |
| 6,141,915 A | * | 11/2000 | Andersen et al. ............ 52/220.8 |
| 6,185,885 B1 | * | 2/2001 | Thaler ............................ 52/219 |
| 6,360,502 B1 | * | 3/2002 | Stahl, Jr. ..................... 52/220.8 |

FOREIGN PATENT DOCUMENTS

| | | |
|---|---|---|
| DE | 3326051 | 2/1985 |
| GB | 1346100 | 2/1974 |
| GB | 2 203 900 A | 10/1988 |
| GB | 2284989 | 6/1995 |
| JP | 10325591 | 12/1998 |
| SE | 372811 | 1/1972 |
| WO | WO 01/09538 A1 | 2/2001 |

* cited by examiner

*Primary Examiner*—Lynne H. Browne
*Assistant Examiner*—James M. Hewitt
(74) *Attorney, Agent, or Firm*—Burns, Doane, Swecker & Mathis, L.L.P.

(57) ABSTRACT

The present invention relates to an ventilation duct construction and a method which increases the fire-retardant capability of a ventilation duct. According to the invention, an improved fire-retardant capability of a ventilation duct or sound absorber is obtained by providing the ventilation duct with a shielding sheet at a distance from the same so that an air gap is formed therebetween. The time during which the outside temperature of the construction can be kept down is prolonged, while the construction remains compact.

37 Claims, 8 Drawing Sheets

VENTILATION DUCT CONSTRUCTION AND METHOD

FIELD OF THE INVENTION

The present invention relates to a ventilation duct construction, comprising a ventilation duct which is provided with insulation and through which air is allowed to flow, as well as a method of providing a ventilation duct. An increased fire-retardant capability of the ventilation duct is achieved by means of the invention.

Fire-retardant capability is here defined as the capability to resist such a temperature rise of the duct air as causes a temperature rise on the outside of the construction.

TECHNICAL BACKGROUND

To prevent fire from spreading in ventilation ducts, it is common to provide the ventilation ducts with some kind of insulating material, such as rock wool, which is resistant to high temperatures and thus prevents fire from spreading. Conventionally, insulation is arranged on the outside of the wall of the duct and is in most cases provided with an outer metal cover.

The ventilation ducts serve to convey air, but noise also propagates easily. By insulating, at least in some sections of the ducts, the inside of the ducts with sound-absorbing material, such as rock wool or glass wool, and lately also materials which are less fire-retardant, e.g. polyester insulation, it is possible to absorb noise efficiently. Hereinafter, sound-absorbing sections of ventilation ducts will also be referred to as sound absorbers.

In case of fire, it is very important to keep down the temperature of the outside of insulated ventilation ducts or sound absorbers as long as possible to increase the fire safety of the surroundings and close objects.

Since sound absorbers often are enlarged in cross-section compared with other ventilation duct sections and contain insulation with a limited fire-retardant capability, the problems of bulkiness and of obtaining a sufficient degree of fire-retardancy may be accentuated.

SUMMARY OF THE INVENTION

Therefore, one object of the present invention is to provide an insulated ventilation duct construction, in which the time during which the outside temperature can be kept down in case of fire is prolonged, while the construction remains compact.

It is also an object to provide a simple method which increases the fire-retardancy of an insulated ventilation duct or duct sound absorber.

According to the present invention, these and other objects which will become apparent in the following are achieved by means of a ventilation duct construction, a sound absorber construction and a method, which have the features stated in the appended claims.

The invention is thus based on the understanding that the fire-retardant capability can be increased by arranging, at least partially, a supplemental thin boundary layer outwardly of the insulated duct or the sound absorber, which boundary layer, on the one hand, provides a supplemental cover configuration having what might be considered as a heat-exchange function and, on the other, provides an additional air insulation effect.

According to one aspect of the invention, a protective or shielding sheet made of metal is thus arranged at least partially around and close to the duct and its associated insulation, not in direct contact with the insulated duct, but instead at a short distance from the same so that an air gap is formed therebetween.

Surprisingly, it has been found that this simple measure imparts a much improved fire-retardant capability to the construction. Preferably, the thermal bridge between the shielding sheet and the duct and its associated insulation is made very small, which can easily be achieved with the aid of suitably designed spacer means. Thus, the time of heating the shielding sheet is prolonged and in particular the time of heating its outside, i.e. the outside of the entire construction.

One advantage of said construction is that the shielding sheet, at least initially, has a cooling effect on the hot air in the gap which has been heated by fire. The thicker the selected shielding sheet, the better the cooling capability. The selection of the width of the air gap as well as the thickness of the shielding sheet must be adjusted to the demands on weight and space. It has been found that a satisfactory effect is obtained even when using a very thin shielding sheet and a very small air gap. The shielding sheet is made of metal, such as galvanised steel sheet or stainless steel sheet. A typical shielding sheet of galvanised steel shows a satisfactory effect even with a thickness of less than 10 mm. The shielding sheet preferably has a thickness of less than a few millimeters, more preferably about 1 mm. The size of the air gap, i.e. the distance between the shielding sheet and the insulated duct, is typically less than 50 mm, preferably less than 20 mm, more preferably less than a few millimeters, such as about 1 mm.

The shielding sheet also has another effect, namely that of distributing the heat over the shielding sheet in case it is locally exposed to a considerable temperature rise. This function is particularly pronounced if the shielding sheet is made of a material having good thermal conductivity.

According to one embodiment, the shielding sheet can be provided with through-holes to improve the circulation of air and heat exchange. This is because cold ambient air is to be drawn into the gap through openings at the ends of the shielding sheet, when the hot air leaks out of the gap through the holes of the shielding sheet. As a result, a circulation of air is provided which contributes to the cooling of the air gap and the shielding sheet. The number, shape and size of the holes can be selected depending on the desired qualities of the shielding sheet. However, the size and the number of the holes have to be chosen, since too big or too many holes could counteract the purpose of the shielding sheet. It has, however, been found that good effects are achieved also when the total area of the holes equals half the area of the shielding sheet.

Depending on the circumstances and the security aspects that must be taken into consideration, the position of the shielding sheet may vary. It is possible to surround an entire ventilation duct of about one hundred meters with a shielding sheet in accordance with the invention, preferably in separate sections so as to provide openings for the intake of air. But it is also possible to provide a ventilation duct with shielding sheet only locally along one or more specially selected sections, such as a sound absorber section. Irrespective of the above-mentioned alternatives, it is not necessary to arrange shielding sheet along the entire circumference of the ventilation duct. It is quite possible that extra protection is needed only along a part of the circumference of the duct.

If the ventilation duct is being passed through a through hole in a wall, a shielding sheet according to the invention may be provided at the location of such a section of the ventilation duct.

Thus, according to another aspect of the invention a protecting or shielding sheet is arranged at least partially around and close to a section of the duct near a wall having a through hole, through which the duct is passed. The shielding sheet comprises a first portion extending essentially in parallel with the ventilation duct, and a second portion extending essentially in parallel with the penetrated wall and being located at an end of said first portion nearest to the penetrated wall. The shielding sheet is thus arranged at such a distance that an air gap is formed between the shielding sheet and both the duct and the penetrated wall.

This second aspect of the invention is particularly advantageous in case of fire on one side of the wall through which the ventilation duct is penetrated. Such a fire may increase the temperature in the ventilation duct on said one side, the rising temperature effect propagating through the duct and thus reaching the other side of the wall. A shielding sheet on the other side will provide the inventive fire-retardant effect.

The first portion of the shielding sheet has primarily a cooling effect on the air in the gap between the ventilation duct and the first portion, while the second portion has primarily a cooling effect on the air in the gap between the penetrated wall and the second portion. Thus, the second portion helps to keep the penetrated wall at a lower temperature than would have been the case without the shielding sheet according to the invention. A relatively long second portion means more cooling capacity.

In one embodiment the first and the second portion of the shielding sheet may be integrated. They may be constructed from one and the same blank or from two different blanks brought together. Alternatively, instead of providing a shielding sheet with an integrated first and second portion, two shielding sheet may be arranged in a spaced apart relationship, i.e. in no contact with each other. One sheet will be in parallel with the ventilation duct and the other sheet will be in parallel with the penetrated wall. This achieves a practical opening between the two sheets for intake and/or outlet of air.

Suitably, insulation is provided in connection with said through hole in the penetrated wall. The insulation may for instance be packed between the outside of the duct wall and the wall defining the through hole. The insulation seals the through hole around the ventilation duct. Any, suitable insulating material may be applied. An example is mineral wool packed in the inner, middle part of the hole and the respective hole opening around the duct insulation is sealed with filling material, such as plaster or the like.

The cross-sectional shape of the ventilation duct or the sound absorber may vary. Typical shapes are rectangular and circular, but other shapes are also feasible, since the invention is not limited to any particular shape of the duct. The shape of the shielding sheet is suitably selected according to the shape of the ventilation duct or the sound absorber, and preferably in such manner that the shapes conform with each other. A shielding sheet according to the second aspect of the invention, i.e. applied at a wall penetration, will besides having a shape (said first portion) that confirms with the ventilation duct, also have a generally flat shape (said second portion) near the wall. If e.g. the ventilation duct is circular, said flat shape may be a circular ring or disc with a hole.

The manner in which the duct is insulated does not limit the scope of the invention. It is, for instance, possible to arrange, on the outside of the wall of the duct, a standard insulation, the outside of which is a metal cover adjacent to which the shielding sheet is arranged with the air gap. A ventilation duct section with sound-absorbing insulation is also possible, the shielding sheet being arranged so that an air gap forms between the same and the outer cover of the sound absorber. Other types of insulation are, of course, also feasible, such as thermal insulation.

As already mentioned, the shielding sheet can be kept at a suitable distance from the ventilation duct with the aid of spacer means so that said air gap forms. As examples of spacer means, mention can be made of pins, screws, rivets and distance plates which are arranged between and fixed to the shielding sheet and/or the wall of the ventilation duct or the insulation placed thereon, with or without a cover. In case of said arrangement in connection with a penetrated wall, spacer means may be arranged between the penetrated wall and the shielding sheet (or second portion of the shielding sheet) parallel to that wall.

The design of the spacer means should allow the thermal bridge to be minimised. Thus the spacer means should be small and limited to a small number. It is also possible to form the air gap without any connection at all, and thus without a thermal bridge, between the shielding sheet and the ventilation duct. One possibility is to equip the construction with magnets so that the shielding sheet is kept "floating" about the ventilation duct. If there is enough space, another possibility of completely avoiding thermal bridges is to provide the shielding sheet with an outer suspension which is connected to external holding elements.

Even if the shielding sheet has been discussed so far in connection with both ordinary insulated ventilation ducts and duct sound absorbers (ventilation duct sections with sound-proofing), the function of the shielding sheet is the same, irrespective of the type of duct to which it is applied. The use of a shielding sheet according to the invention does not have to be limited to these variants but could also, for instance, be used in connection with heat or condensation insulated ducts.

Besides the discussed ventilation duct construction, the present invention, as already mentioned, relates to a method which increases the fire-retardant capability of an insulated ventilation duct. According to the method, this is achieved by placing a shielding sheet made of metal externally at least partially around the insulated duct at such a distance from the same that an air gap forms between the shielding sheet and the insulated duct. The invention is thus also applicable to existing installations, both to a conventional existing sound absorber and to other ventilation duct sections.

The invention can also facilitate the mounting of a fire-protected sound absorber in a section of a ventilation duct. It is thus possible, for instance, to remove the fire insulation in the desired section, perforate the duct wall to "let out the sound", arrange sound insulation with an outer cover which forms the duct wall on the perforated duct wall and finally arrange the shielding sheet according to the invention around the outer cover so that an air gap forms between the shielding sheet and the outer cover.

One common way of arranging a sound absorber in an existing ventilation duct is to cut off the duct and insert by splicing the sound absorber. The one skilled in the art will realise that a sound absorber equipped with a shielding sheet according to the present invention can also be arranged in a ventilation duct in the same manner.

The invention makes it possible to lower the requirements placed on the absorbing material of a sound absorber as concerns fire-retardancy for the benefit of improved absorbency, resulting in the possibility of reducing the dimensions in the transverse direction, while maintaining the same total fire-retardancy level.

DESCRIPTION OF PREFERRED EMBODIMENTS

Figure 1:
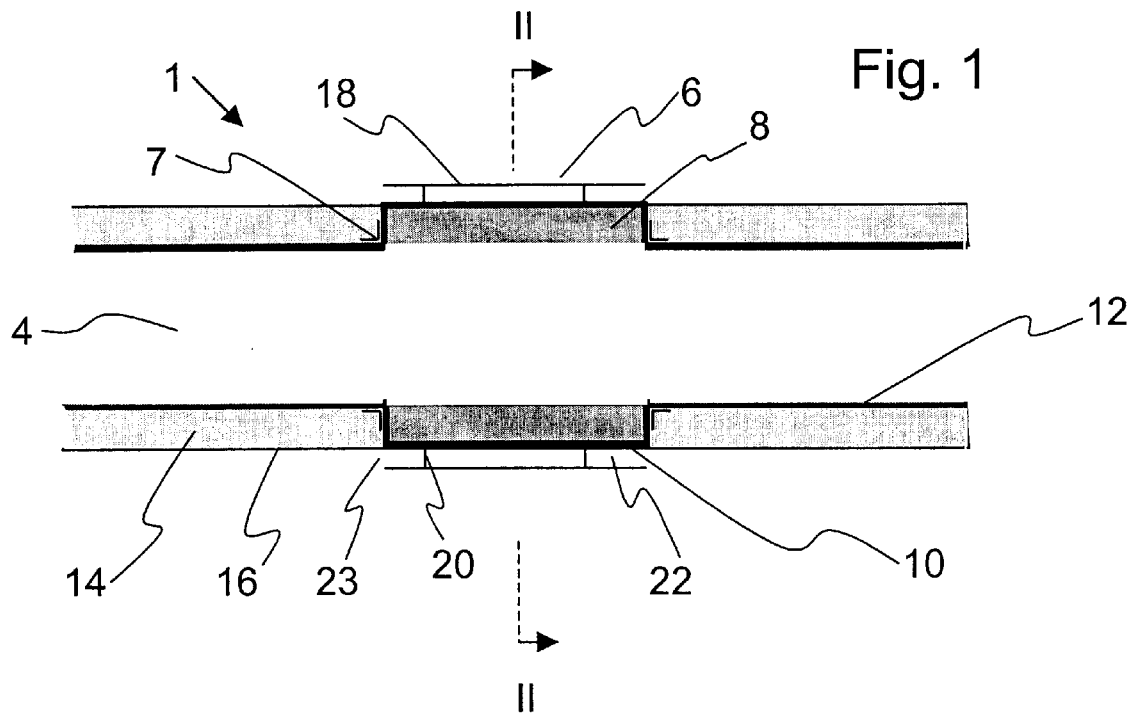
FIG. 1 schematically shows a longitudinal cross-section of a ventilation duct construction according to an embodiment of the present invention.
Figure 3:
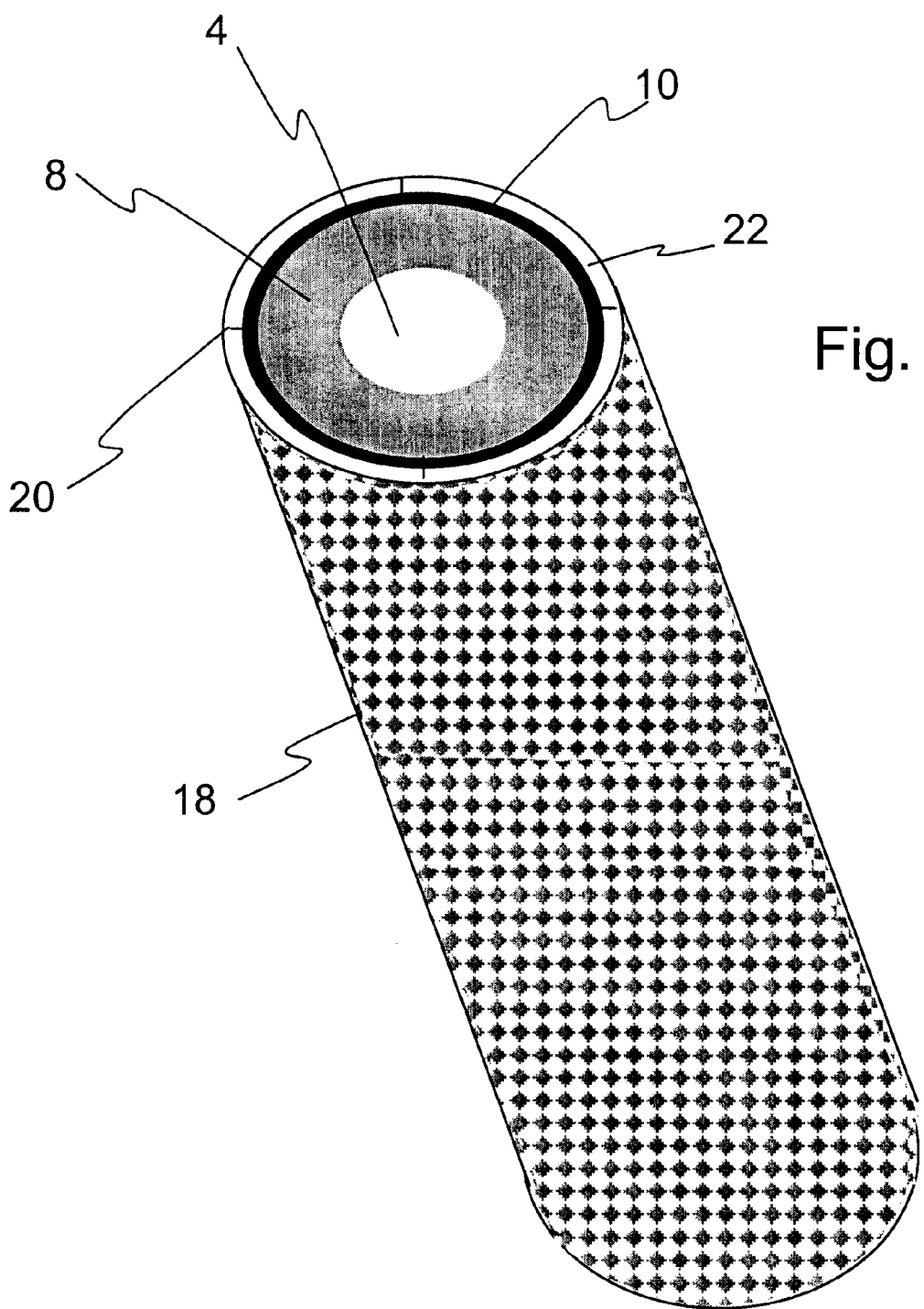
FIG. 3 schematically shows a perspective view of the sound absorber in FIGS. 1 and 2.

FIG. 1 schematically shows a longitudinal cross-section of a ventilation duct construction 1 according to an embodiment of the present invention. The Figure illustrates part of a ventilation duct 4 through which air is allowed to flow. The ventilation duct 4 is provided with a sound absorber section 6, which is fixed by means of annular flanges 7 projecting over and surrounding the wall 12 of the ventilation duct 4. In usual manner, the sound absorber 6 comprises an annular sound insulation 8 which is made of glass wool and which is open inwards to absorb noise propagating inside the ventilation duct 4. The sound insulation 8 is placed at an outer cover 10 of the sound absorber 6. On each side of the sound absorber 6, a fire insulation 14 made of rock wool is arranged on the outside of the wall 12 of the ventilation duct 4, said fire insulation 14 being delimited outermost by a metal cover 16. The wall 12 of the ventilation duct 4 and its associated fire insulation 14 and metal cover are joined to the sound absorber 6 by means of the flanges 7, so that the wall 12 of the ventilation duct 4 merges into the duct-forming outer cover 10. A sleeve-shaped shielding sheet 18 which has a thickness of about 0.7 mm and is made of galvanised steel sheet is arranged around the outer cover 10 of the sound absorber 6 in accordance with the invention. Rivets 20 which are arranged between the shielding sheet 18 and the outer cover 10 keep the shielding sheet 18 at a distance of about 1 mm from the outer cover 10 so that an air gap 22 forms therebetween. Openings 23 at the ends of the sheet allow cold ambient air to enter into the gap. The shielding sheet is also perforated (which is shown in FIG. 3), and therefore a satisfactory air circulation with a cooling effect is obtained. The sound absorber 6 which is provided with the shielding sheet 18 obtains considerably increased fire-retardancy compared with a sound absorber without a shielding sheet. This will be discussed in more detail in connection with FIG. 6.

The shielding sheet 18 preferably does not form part of a mechanically continuous fluid path with the insulated duct 4. In other words, fluid that flows through the duct 4 is not directed such that it flows through any passage defined by the shielding sheet 18 either before or after flowing through the duct.

Figure 2:
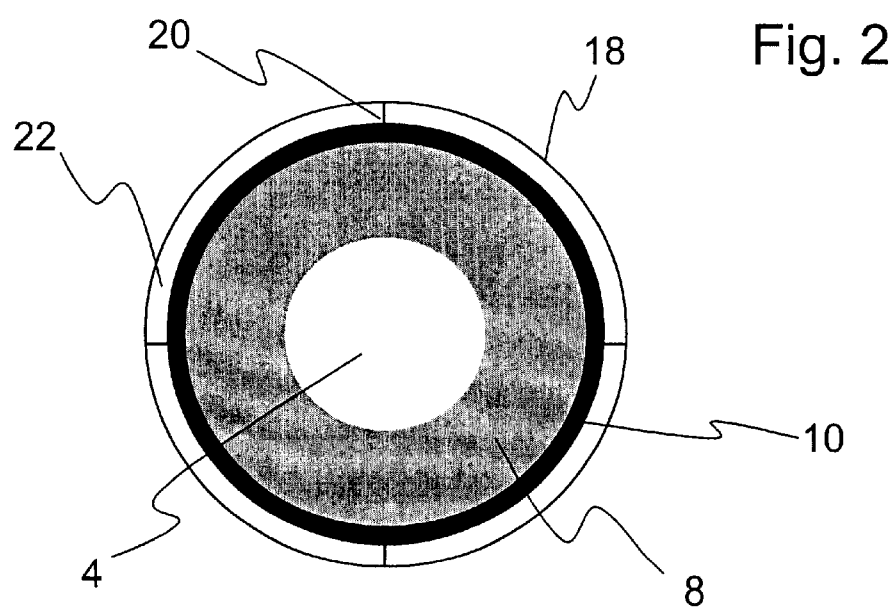
FIG. 2 schematically shows a cross-section of the construction in FIG. 1 along the line II—II.

FIG. 2 schematically shows a cross-section of the construction in FIG. 1 along the line II—II. It is apparent that in this embodiment the sound absorber is round in cross-section.

FIG. 3 schematically shows a perspective view of the sound absorber in FIGS. 1 and 2, a perforated shielding sheet 18 being illustrated, which provides a satisfactory air circulation, resulting in cooling of the shielding sheet 18 and the air gap 22.

Figure 4:
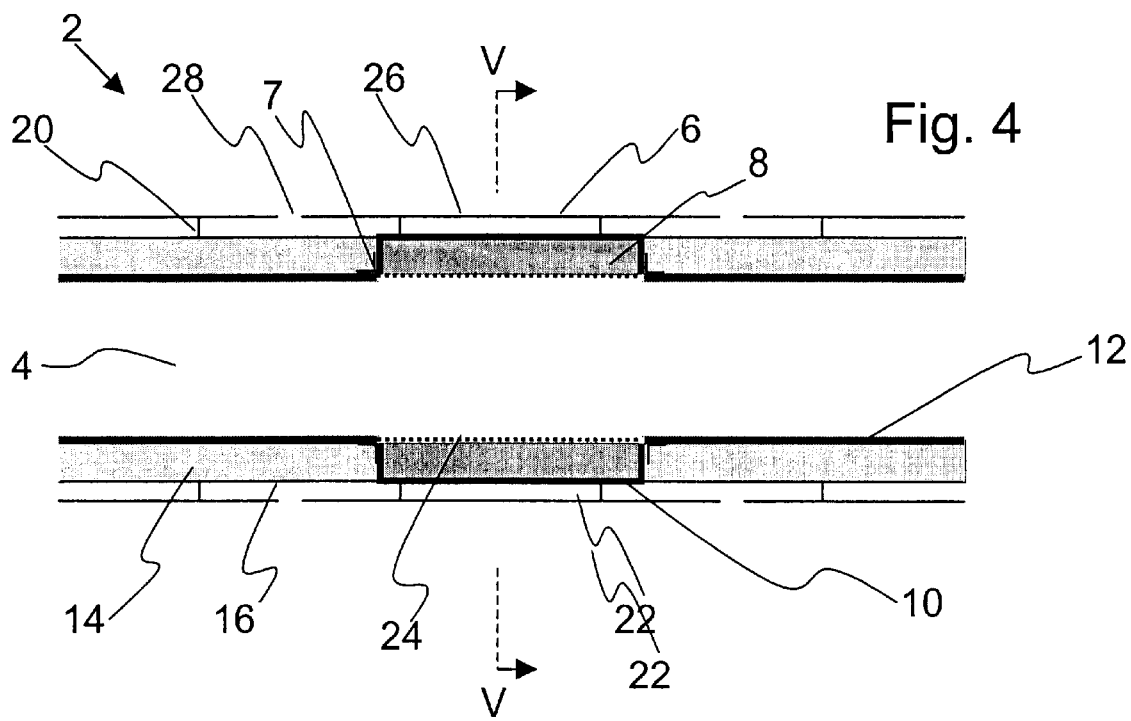
FIG. 4 schematically shows a longitudinal cross-section of a ventilation duct construction according to another embodiment of the present invention.

FIG. 4 schematically shows a longitudinal cross-section of a ventilation duct construction 2 according to another embodiment of the present invention. In this Figure, the same reference numerals are used as in FIG. 1 for equivalent construction components. In contrast to the embodiment in FIG. 1, the wall 12 of the ventilation duct, adjacent to the sound absorber section, merges into the wall 24 of a foraminated pipe, which is an integral part of the sound absorber. The foraminated pipe through which noise is emitted serves as a support for the sound insulation 8 resting thereon. Also in this case, the sound insulation 8 is, in usual manner, provided with an outer cover 10. Yet another difference is that the shielding sheet 26 according to this embodiment is arranged not only around the sound absorber 6, but also around adjoining sections of the ventilation duct part. Consequently, increased fire-retardancy is obtained for the critical sound absorber section as well as adjoining sections. In the Figure, the shielding sheet 26 is divided so that openings 28 allow the inflow of cooling air in a manner corresponding to that of the openings 23 in FIG. 1. A very good effect is, however, obtained for the shielding sheet 26 also without the openings 28.

Figure 5:
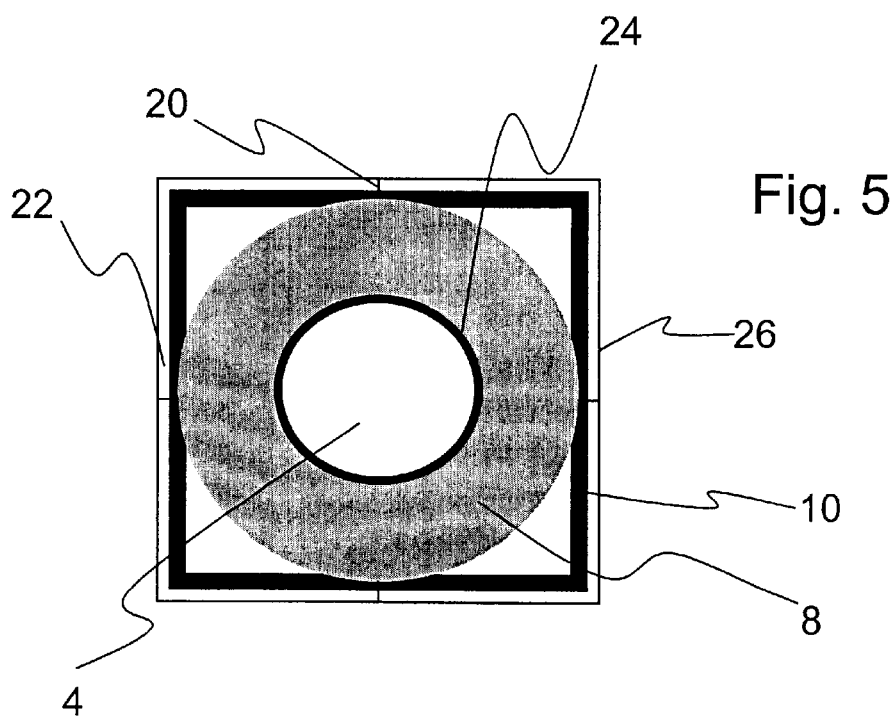
FIG. 5 schematically shows a cross-section of the construction in FIG. 4 along the line V—V.

FIG. 5 schematically shows a cross-section of the construction in FIG. 4 along the line V—V. As shown, the sound absorber in this embodiment is quadrangular in cross-section, which is to illustrate that the sound absorber is connected to a ventilation duct with quadrangular cross-section.

FIGS. 1–5 are only shown for the purpose of exemplification and thus not according to scale. In addition, it goes without saying that the person skilled in the art will understand that there are many other embodiments within the scope of the invention. The sound absorber in FIG. 1 may, for instance, be provided with a foraminated pipe according to the construction in FIG. 4, just like the sound absorber in FIG. 4 can be designed in a different manner, without a foraminated pipe. Moreover, the cross-sectional shapes are exchangeable, as is also the length of the shielding sheet, and it is possible to select either a perforated or a non-perforated shielding sheet.

Figure 6:
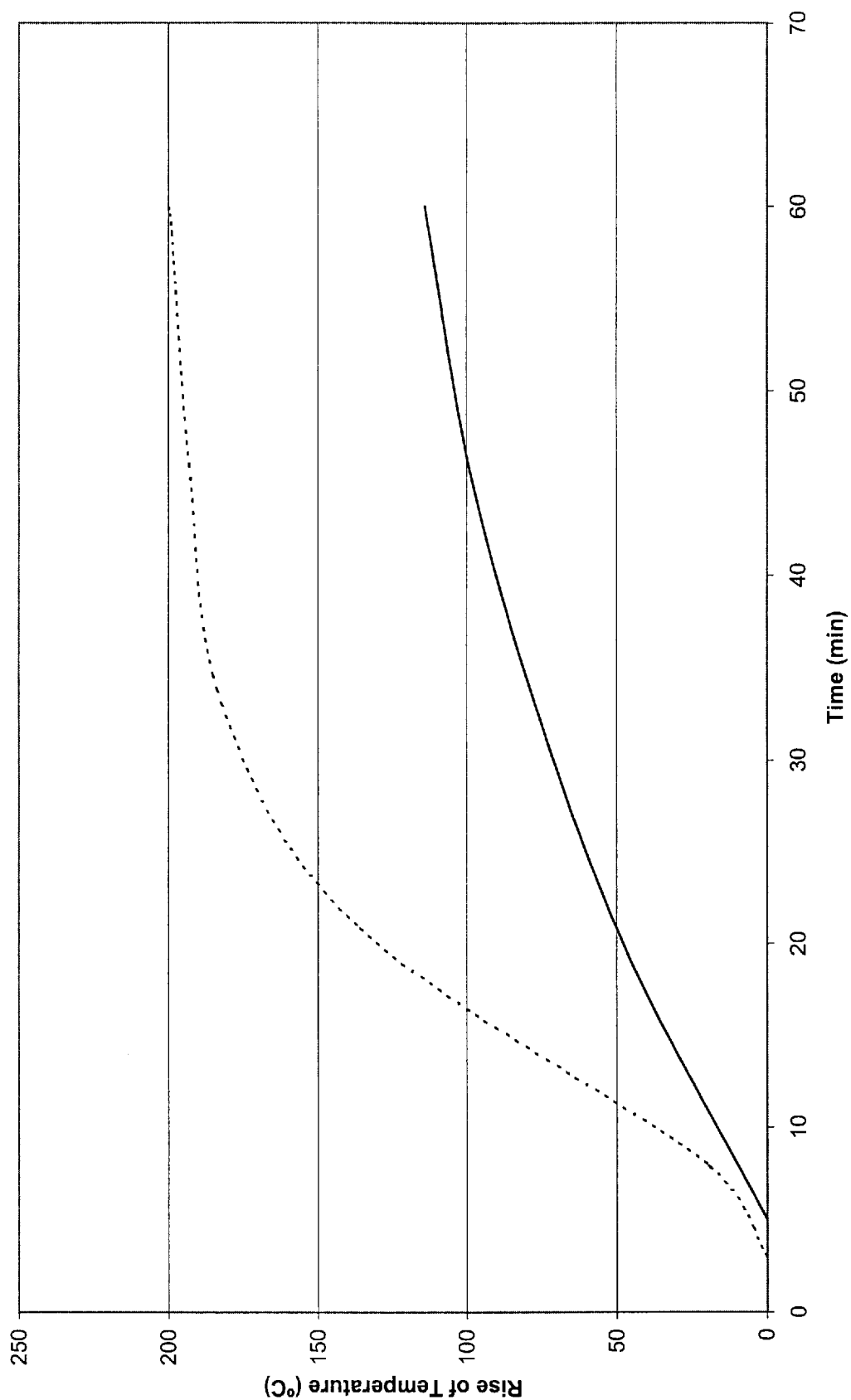
FIG. 6 shows a diagram in which a comparison is made between a sound absorber having a shielding sheet according to the present invention and a sound absorber without a shielding sheet.

FIG. 6 shows a diagram in which a comparison is made between a sound absorber with a shielding sheet according to the present invention and a sound absorber without a shielding sheet. Fire tests were performed by connecting a furnace to an inlet end of the respective sound absorbers, so that the air duct of the sound absorbers was connected with the furnace air. The temperature of the furnace was increased according to a standard fire curve (to about 600° C. after 6 min and up to slightly more than 900° C. after 60 min). Several thermoelements were placed on the outside of the respective constructions, i.e. on the outside of the shielding sheet and the outside of the cover of the sound absorber, respectively. In the Figure, temperature values measured by a thermoelement, which was placed in the centre of the respective constructions, are compared. The dashed curve shows the temperature change on the outside of an ordinary sound absorber without any shielding sheet. The unbroken curve shows the temperature change on the outside of an inventive shielding sheet which is arranged on a sound absorber. As clearly appears from the curves, a marked difference is obtained between the sound absorber with a shielding sheet and the sound absorber without a shielding sheet. The steep inclination at the beginning of the dashed curve is also worth noting. After only not quite ten minutes, the outside temperature of the conventional sound absorber increases dramatically, whereas when comparing with the sound absorber provided with a shielding sheet an even and slowly increasing temperature can be noted. As already suggested, measurements have also been made at other measuring points than in the centre of the sound absorbers, such as at the inlet end, at the other end and at a plurality of points in between. However, for the sake of clarity we have chosen to illustrate the difference with the measurement in the centre. It can, however, be mentioned that at all measuring points the sound absorber which is provided with shielding sheet exhibited the lowest temperatures after the 60 min long fire test. At certain measuring points, there was a difference of as much as 150° C. between the sound absorber with shielding sheet and the sound absorber without shielding sheet. The shielding sheet which was used in the test was not perforated and had a thickness of 0.7 mm and was placed around the sound absorber so that the air gap had a width of 1.0 mm. The sound absorber had the following dimensions: length 500 mm, width 285 mm, height 215 mm.

Figure 7:
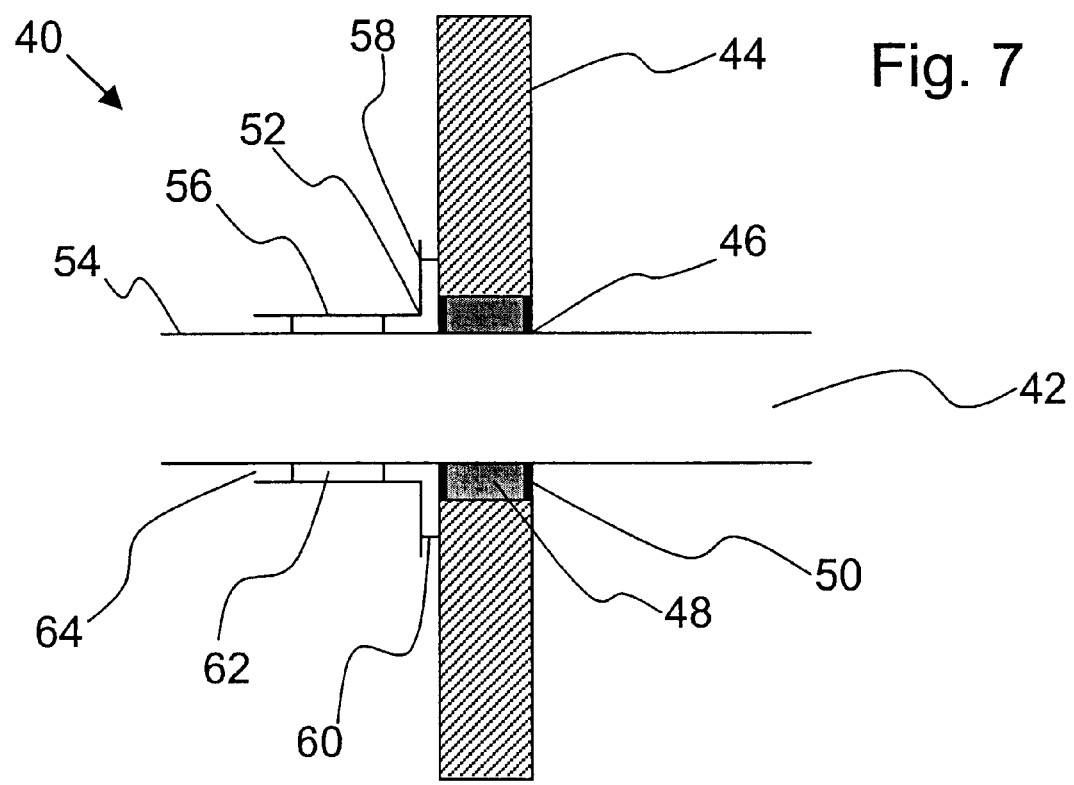
FIG. 7 schematically shows a longitudinal cross-section of a ventilation duct construction according to yet another embodiment of the present invention.

FIG. 7 schematically shows a longitudinal cross-section of a ventilation duct construction 40 according to yet another embodiment of the present invention. The Figure illustrates part of a ventilation duct 42 through which air is allowed to flow. The ventilation duct construction 40 also comprises a wall 44 having a through hole 46, through which the ventilation duct 42 is passed. The through hole 46 surrounding the ventilation duct 42 is sealed by means of insulation 48, such as fire insulation of any suitable type, e.g. mineral wool. The two ends of the through hole 46 are suitably defined by a respective plaster coat 50, which boarders on the outer surface of the penetrated wall 44. A shielding sheet 52, made of galvanised steel sheet is arranged around the ventilation duct wall 54 on one side of the penetrated wall 44. The shielding sheet 52 comprises two portions. A first portion 56 of the shielding sheet 52 has essentially a tubular or sleeve shape, similarly to the shielding sheets shown in FIGS. 1–5. The first portion 56 extends in parallel with the ventilation duct 42 and surrounds the same. A second portion 58 of the shielding sheet 52 is generally ring-shaped, in the form of a disc with a hole. The second portion 58 is located at the end of the first portion 56 nearest to the penetrated wall 44, and extends in parallel with the penetrated wall 44. Thus, the second portion 58 is like a thin first portion end having an enlarged diameter (see FIGS. 8A and 8B). Rivets 60 which are arranged between the shielding sheet 52 and both the duct wall 54 and the penetrated wall 44 keep the shielding sheet 52 at a distance of about 1 mm from both the duct wall 54 and the penetrated wall 44 so that an air gap 62 forms therebetween. Openings 64 at the end of the sheet 52 allow cold ambient air to enter into the gap 62. In case of fire at a location on the other side of the penetrated wall 44, i.e. the side not provided with the shielding sheet 52, the air inside the adjacent ventilation duct 42 will be affected. The temperature in the ventilation duct 42 will rise, and this temperature rise will propagate along the ventilation duct 42 through the penetrated wall 44. The shielding sheet 52 will have the previously described function of increasing the fire-retardant capability of the ventilation duct construction 40. The angled shielding sheet 52 will delay temperature rise on the outside of the construction 40 caused by heat from the inside of the ventilation duct 42 as well as heat penetrating the through hole 46 and the insulation 48. It is to be noted that the penetrated wall 44 is to be regarded as a part of the ventilation duct construction 40.

Figure 8A:
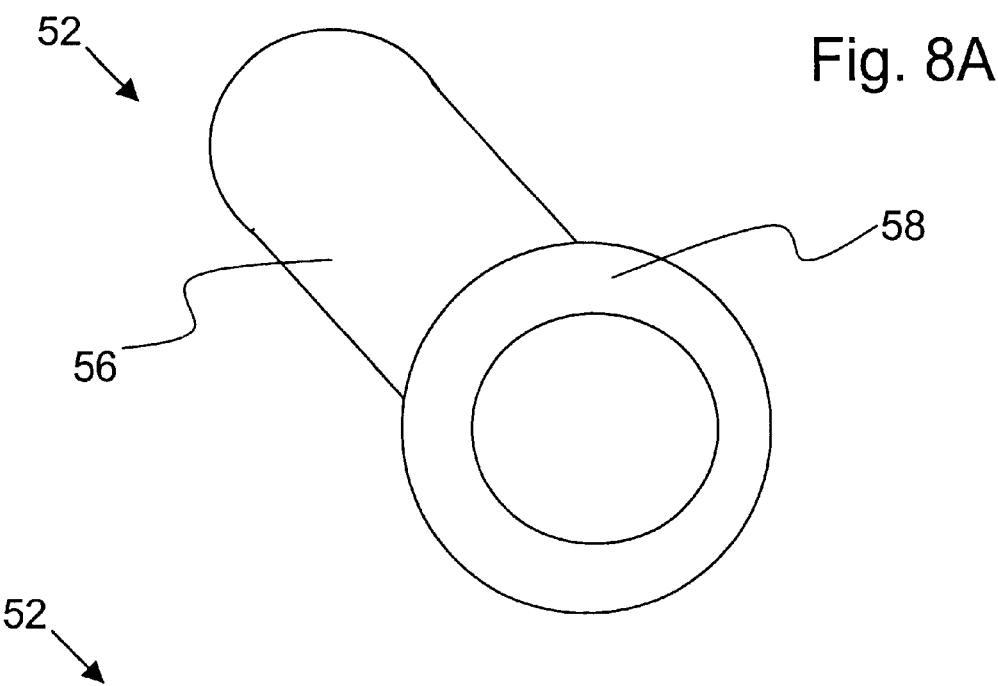
FIGS. 8A and 8B schematically show perspective views of the shielding sheet in FIG. 7.
Figure 8B:
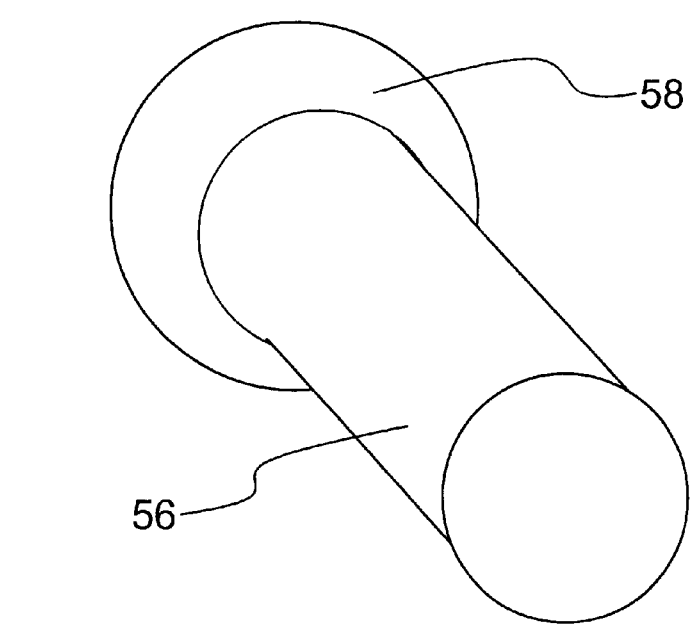

FIGS. 8A and 8B schematically show perspective views of the shielding sheet 52 in FIG. 7. In FIG. 8A the second portion 58 is seen nearest to the viewer, while in FIG. 8B the second portion 58 is seen farthest from the viewer. As is seen from these Figures, the shielding sheet 52 comprises a first tubular portion 56 and a second thin annular portion 58. The second portion 58 is arranged perpendicularly to the end of the first portion 56. The diameter of the second portion 58 is suitably large enough to shield at least the insulation sealing the through hole in the penetrated wall. It is to be understood that for a ventilation duct having a rectangular, square or other non-circular cross-section, the shielding sheet is suitably designed with corresponding cross-sections.

Figure 9:
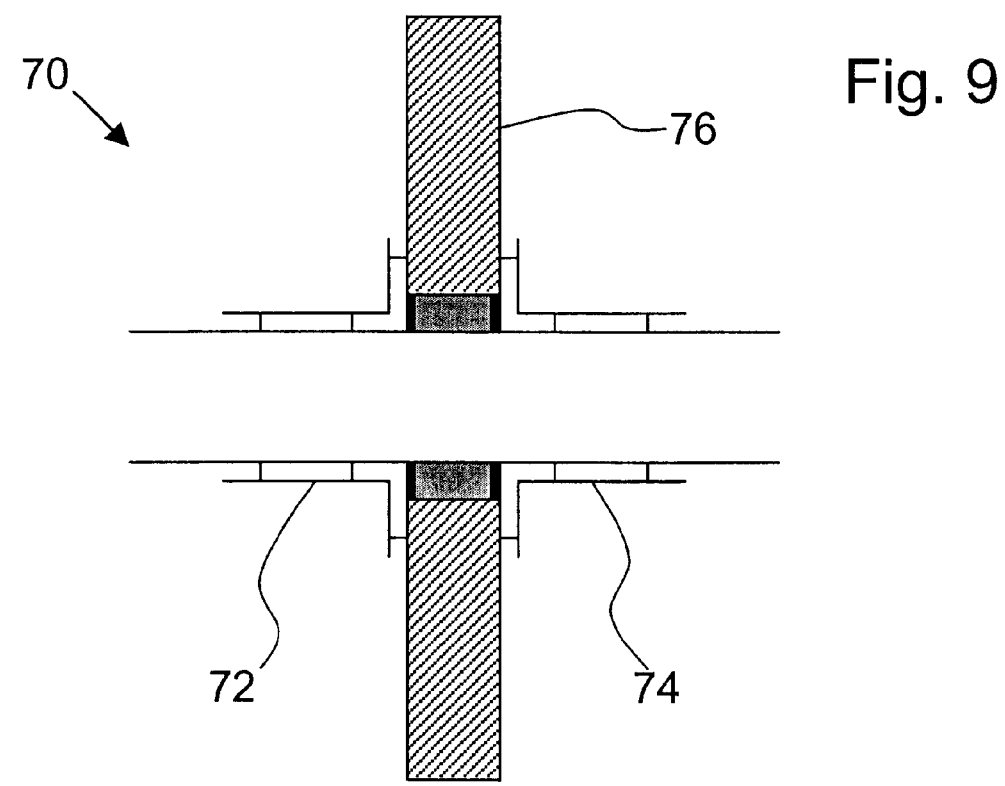
FIG. 9 schematically shows a longitudinal cross-section of a ventilation duct construction according to yet another embodiment of the present invention.

FIG. 9 schematically shows a longitudinal cross-section of a ventilation duct construction 70 according to yet another embodiment of the present invention. This ventilation duct construction 70 is similar to that of FIG. 7. However, in this case a shielding sheet 72, 74 is provided on both sides of a penetrated wall 76. This embodiment increases the fire-retardant capability of the construction on both sides of the wall 76.

Figure 10:
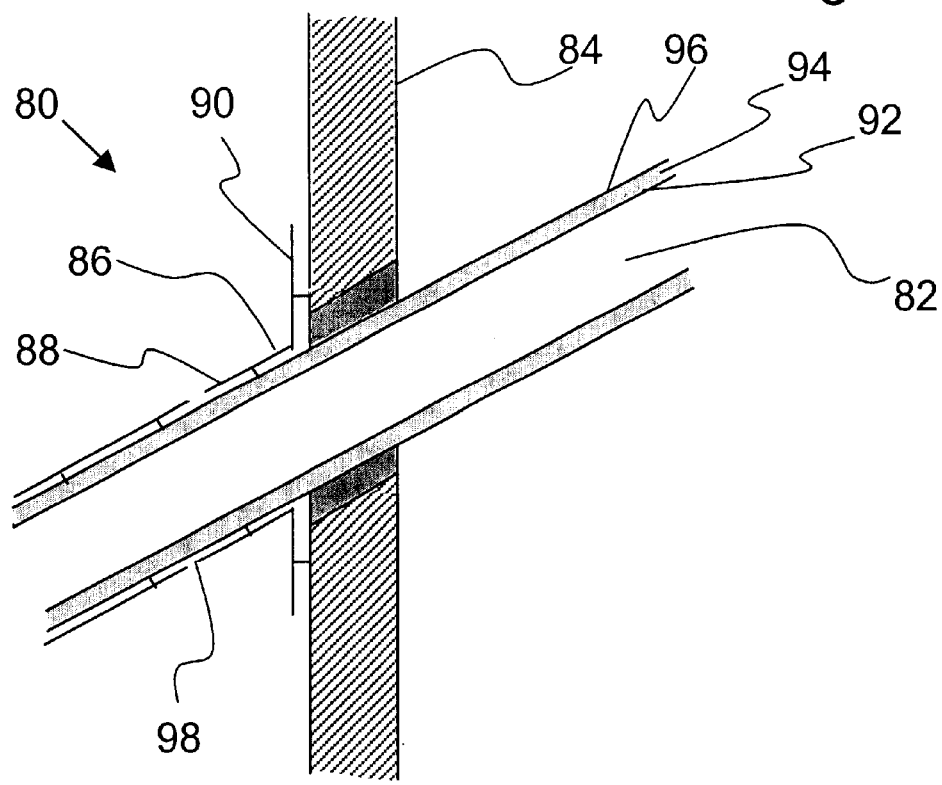
FIG. 10 schematically shows a longitudinal cross-section of a ventilation duct construction according to yet another embodiment of the present invention.

FIG. 10 schematically shows a longitudinal cross-section of a ventilation duct construction 80 according to yet another embodiment of the present invention. Unlike the previously shown embodiments with a penetrated wall, the longitudinal axis of the ventilation duct 82 does not conform with the normal of the penetrated wall 84. Therefore the shielding sheet 86 is designed so that the longitudinal axis of the first portion 88 does not conform with the normal of the plane of the second portion 90, but runs in parallel with the extension of the duct 82. The second portion 90 extends in parallel with the penetrated wall 84. Furthermore, FIG. 10 illustrates that on the outside of the ventilation duct wall 92 a fire insulation 94 is arranged. The fire insulation is delimited outermost by a metal cover 96 (as in FIGS. 1 and 4). The shielding sheet 86 according to this embodiment is arranged not only in the vicinity of the penetrated wall 84 but also further away along the ventilation duct 82. Consequently, increased fire-retardancy is obtained for the entire shielded ventilation duct. In FIG. 10 as in FIG. 4, the shielding sheet 86 is divided so that openings 98 allow the inflow of cooling air.

Figure 11:
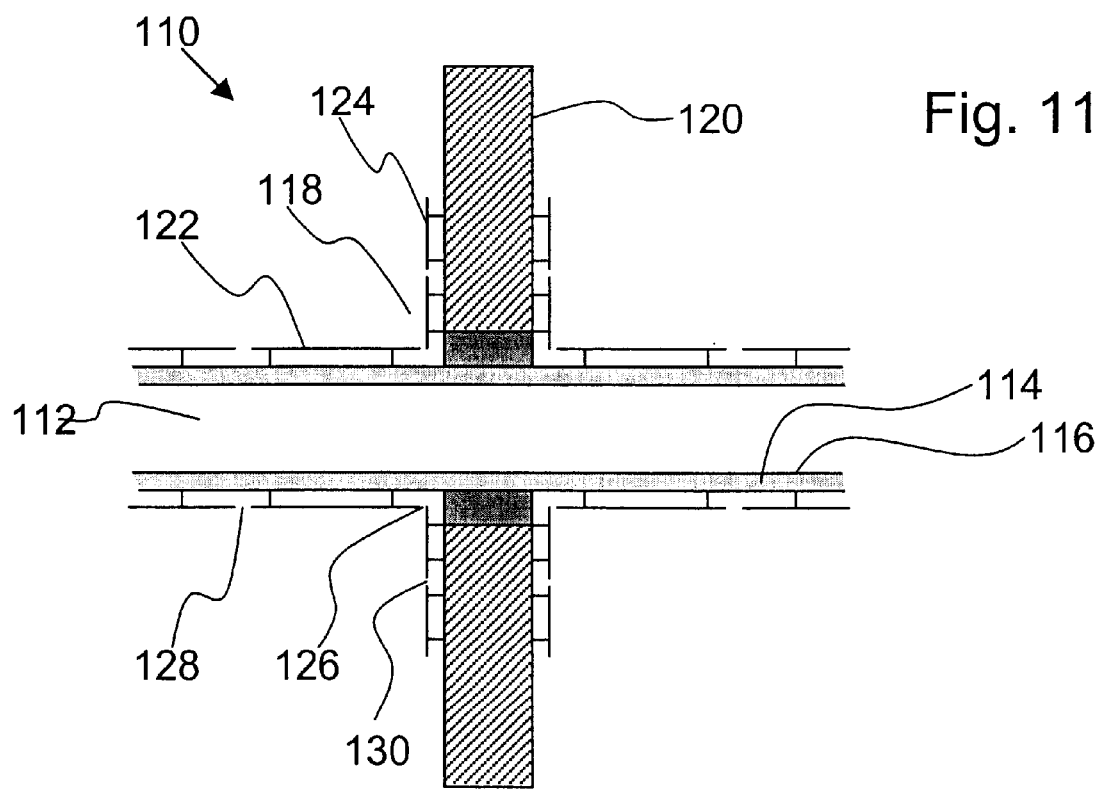
FIG. 11 schematically shows a longitudinal cross-section of a ventilation duct construction according to a further embodiment of the present invention.

FIG. 11 schematically shows a longitudinal cross-section of a ventilation duct construction 110 according to a further embodiment of the present invention. In this embodiment, as in FIG. 10, a ventilation duct 112 is provided with insulation 114 at the duct wall 116. Shielding sheets 118 are provided on both sides of a penetrated wall 120. In this embodiment, instead of having an integrated sheet with a first and a second portion, a first shielding sheet 122 and a second shielding sheet 124 is provided on each side of the penetrated wall 120. The first shielding sheet 122 and the second shielding sheet 124 are spaced apart, i.e. they are not in contact with each other. Thus, an opening 126 is created between the first shielding sheet 122 and the second shielding sheet 124 for intake and/or outflow of air. Furthermore additional respective openings 128, 130 are provided on both the first shielding sheet 122 and the second shielding sheet 124, for further improvement of the air circulation.

It is to be understood that even though certain embodiments have been shown in FIGS. 7–11 others are possible as well. Thus, the shown features may be combined in numerous ways. It is also to be noted that the through hole may be without sealing insulation, if the penetrated wall in itself is insulating. The through hole around the ventilation duct may be without insulation, and only be sealed at the outer surfaces of the penetrated wall by means of gypsum.

Figure 12:
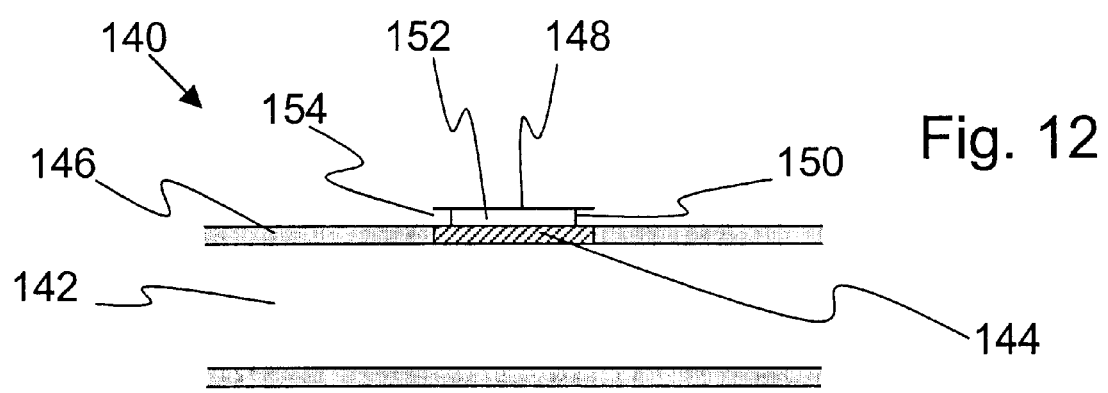
FIG. 12 schematically shows a longitudinal cross-section of a ventilation duct construction according to a further embodiment of the present invention.

FIG. 12 schematically shows a longitudinal cross-section of a ventilation duct construction 140 according to a further embodiment of the present invention. In this embodiment a ventilation duct 142 is provided with a hatch 144, which may be opened for accessing and cleaning the ventilation duct 142. The sections of the ventilation duct 142 adjacent to the hatch 144 are in usual manner provided with insulation 146. The hatch 144 itself is in this Figure without insulation, however, the person skilled in the art understands that the inside of the hatch 144 may also be provided with insulation. A sleeve-shaped shielding sheet 148 made of galvanised steel sheet is arranged partly around the section with the hatch in accordance with the invention. Spacer pins 150 which are arranged between the shielding sheet 148 and the hatch 144 keep the shielding sheet 148 at a distance of about 1 mm from the hatch 144 so that an air gap 152 forms therebetween. Openings 154 at the ends of the sheet 148 allow cold ambient air to enter into the gap 152.

It should be noted that the embodiments shown in the Figures are not to scale and are only illustrated schematically for elucidatory purposes.

It is to be understood that even though certain embodiments have been shown numerous modifications and variations can be made without departing from the scope of the present invention defined in the accompanied claims.

What is claimed is:

1. A ventilation duct construction, comprising:
   a ventilation duct tough which air is allowed to flow, the duct being insulated by means of insulation in contact with and surrounding a wall of the duct;
   a shielding sheet, shielding sheet being arranged external to and at least partially around the duct and its associated insulation at a distance from the duct such that an air gap is formed between the shielding sheet and the insulation, without the shielding sheet forming part of a mechanically continuous fluid path with the insulated duct, wherein a fire-retardant capability, measured as a capability to resist a temperature rise of the duct air that causes a temperature rise on an outside of the construction outside of the shielding sheet is considerably increased.

2. A ventilation duct construction as claimed in claim 1, wherein an opening for air intake is arranged at respective ends of the shielding sheet so that ambient air is allowed to enter between the shielding sheet and the insulated duct.

3. A ventilation duct construction as claimed in claim 1, which comprises, at least at a section of the duct wall, sound insulation inside an outer cover, the air gap being formed between the shielding sheet and the outer cover.

4. A ventilation duct construction as claimed in claim 3, wherein said outer cover constitutes the duct wall.

5. A ventilation duct construction as claimed in claim 3, wherein said sound insulation is supported from the inside by a foraminated support construction, the support construction constituting the duct wall.

6. A ventilation duct construction as claimed in claim 5, wherein said support construction is a perforated pipe.

7. A ventilation duct construction as claimed in claim 1, which comprises, at least at a section of the duct wall, fire insulation which is arranged on the outside of the duct wall, the air gap being formed between the shielding sheet and the fire-insulated duct wall.

8. A ventilation duct construction as claimed in claim 7, wherein the fire insulation on the outside of the duct wall is provided with an outer surface layer.

9. A ventilation duct construction as claimed in claim 8, wherein said outer surface layer is a metal cover.

10. A ventilation duct construction as claimed in claim 1, wherein spacer means are arranged to dimension said air gap.

11. A ventilation duct construction as claimed in claim 8, wherein spacer means are arranged to dimension said air gap and extend between the shielding sheet and said outer surface layer.

12. A ventilation duct construction as claimed in claim 3, wherein spacer means are arranged to dimension said air gap and extend between the shielding sheet and said outer cover.

13. A ventilation duct construction as claimed in claim 1, wherein said air gap distance is less than 50 mm.

14. A ventilation duct construction as claimed in claim 13, wherein said air gap distance is less than 20 mm.

15. A ventilation duct construction as claimed in claim 14, wherein said air gap distance is about 1 mm.

16. A ventilation duct construction as claimed in claim 1, wherein the thickness of the shielding sheet is less than 10 mm.

17. A ventilation duct construction as claimed in claim 16, wherein said air gap distance is about 1 mm.

18. A ventilation duct construction as claimed in claim 1, wherein the shielding sheet is provided with through-holes.

19. A ventilation duct construction as claimed in claim 1, further comprising a penetrated wall having a through hole, through which said ventilation duct is passed, wherein the shielding sheet comprises a first portion extending essentially in parallel with the ventilation duct, and a second portion extending essentially in parallel with said penetrated wall and being located at an end of said first portion nearest to said penetrated wall, so that the air gap is formed between the shielding sheet and both the duct and said penetrated wall.

20. A ventilation duct construction as claimed in claim 19, wherein the through hole through which the ventilation duct is passed is sealed by means of the insulation provided on the outside of the duct wall.

21. A ventilation duct construction as claimed in claim 19, wherein spacer means are arranged to dimension said air gap and extend between the shielding sheet and said penetrated wall.

22. A ventilation duct construction as claimed in claim 1, further comprising a penetrated wall having a through hole, through which said ventilation duct is passed, wherein the shielding sheet extends essentially in parallel with the ventilation duct, and another shielding sheet extends essentially in parallel with said penetrated wall and is located spaced apart from and at the end nearest to said penetrated wall of said shielding sheet extending in parallel with the ventilation duct, so that the air gap is formed between the shielding sheets and the duct and said penetrated wall, respectively.

23. A ventilation duct construction as claimed in claim 1, wherein the shielding sheet is made of metal.

24. A method of providing a ventilation duct, comprising the steps of:

insulating the duct by means of insulation in contact with and surrounding a wall of the duct; and placing a shielding sheet external to and at least partially around the insulated duct at a distance from the duct such that an air gap is formed between the shielding sheet and the insulation, without the shielding sheet forming part of a mechanically continuous fluid path with the insulated duct, so that the fire-retardant capability of a ventilation duct is increased.

25. A method as claimed in claim 24, which further comprises the step of arranging the shielding so that ambient air is allowed to enter between the shielding sheet and the insulated duct at respective ends of the shielding sheet.

26. A method of providing a ventilation duct as claimed in claim 24 wherein the shielding sheet is made of metal.

27. A ventilation duct construction, comprising:

a ventilation duct through which air is allowed to flow, said ventilation duct being passed through a through hole in a wall;

a shielding sheet comprising a first portion extending essentially in parallel with the ventilation duct without being passed through said through hole, and a second portion extending essentially in parallel with the penetrated wall and being located at an end of said first portion nearest to the penetrated wall, said shielding sheet being arranged external to and at least partially around the duct at a distance from the duct such that an air gap is formed between the shielding sheet and both the duct and the penetrated wall.

28. A ventilation duct construction as claimed in claim 27, wherein the through hole around the ventilation duct is sealed by means of insulation.

29. A ventilation duct construction as claimed in claim 27, wherein said shielding sheet is made of metal.

30. A ventilation duct construction as claimed in claim 27, wherein an opening for air intake to the air is arranged at least at a free end of the first portion and a free end of the second portion so that ambient air is allowed to enter between the shielding sheet and the ventilation duct.

31. A method of providing a penetration of a ventilation duct in a wall, comprising the steps of:

making a through hole in the wall;

passing the ventilation duct through the hole; and placing a shielding sheet, which comprises a first and a second portion, external to and at least partially around the duct at a distance from the duct such that an air gap is formed between the shielding sheet and both the duct and the penetrated wall, and so that the first portion extends essentially in parallel with the ventilation duct without passing through said through hole and the second portion extends essentially in parallel with the penetrated wall and being located at an end of said first portion nearest to the penetrated wall.

32. A method as claimed in claim 31, which further comprises the step of sealing the through hole by means of insulation.

33. A method of providing a ventilation duct construction which comprises a ventilation duct through which air is allowed to flow, said ventilation duct being passed through a through hole in a wall, the method comprising the step of:

placing a shielding sheet, which comprises a first and a second portion, external to and at least partially around the duct at a distance from the duct such that an air gap is formed between the shielding sheet and both the duct and the wall, and so that the first portion extends essentially in parallel with the ventilation duct without passing through said through hole and the second portion extends essentially in parallel with the penetrated wall and being located at an end of said first portion nearest to the wall.

34. A Ventilation duct construction, comprising:

a ventilation duct through which air is allowed to flow, the duct being insulated by means of insulation in contact with and surrounding a wall of the duct;

a shielding sheet, the shielding sheet being arranged external of and at least partially round the duct with its associated insulation at a distance from the duct such that an air gap is formed between the shielding sheet and the insulation, the air gap being subject to natural convection during normal operation of the ventilation duct construction in case of a change of temperature therein in relation to the temperature of the ambient air, by being arranged in fluid communication with the ambient air so as to enable air to enter the air gap at one area of the shielding sheet and exit the air gap at another area of the shielding sheet, whereby fire-retardant capability, measured as a capability to resist a temperature rise of the duct air that causes a temperature rise on the outside of the construction outside of the shielding sheet is considerable increased.

35. A ventilation duct construction as claimed in claim 34, wherein air is enabled to enter the air gap at one open end of the shielding sheet and exit the air gap at another open end of the shielding sheet.

36. A ventilation duct construction as claimed in claim 34, wherein the shielding sheet has at least one open end and is provided with through-holes, and wherein air is enabled to enter the air gap at one of said at least one open end or said through-holes and exit through the other one of said at least one open end or said through-holes.

37. A ventilator duct construction as claimed in claim 34, wherein the shielding sheet is made of metal.

* * * * *